Figure 1:
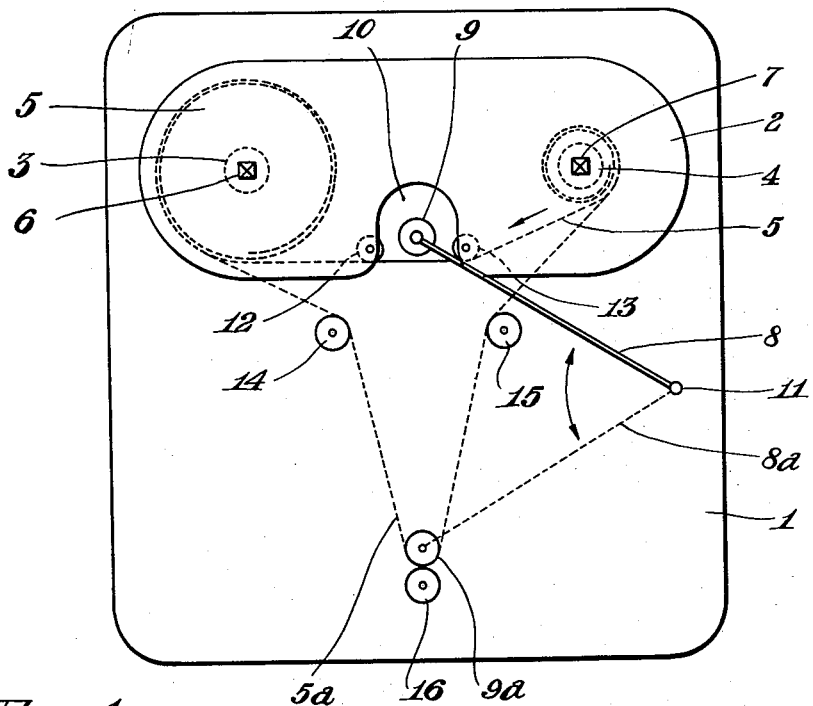

July 1, 1952  J. J. C. HARDENBERG  2,601,955
AUTOMATIC PHOTOGRAPHIC AND SOUND RECORD APPARATUS
Filed May 2, 1946

INVENTOR.
JAN JESAYAS CHRISTIAAN HARDENBERG.
BY
Wenderoth, Lind & Ponack
ATTORNEYS Patented July 1, 1952

2,601,955

UNITED STATES PATENT OFFICE 2,601,955

AUTOMATIC PHOTOGRAPHIC AND SOUND RECORD APPARATUS

Jan Jesayas Christiaan Hardenberg, Eindhoven, Netherlands, assignor to Hartford National Bank and Trust Company, Hartford, Conn., as trustee Application May 2, 1946, Serial No. 666,694
In Belgium March 14, 1945

Section 1, Public Law 690, August 8, 1946
Patent expires March 14, 1965

5 Claims. (Cl. 242—55)

This invention relates to a device for the reproduction of picture and/or sound records taken on a band-shaped carrier, which consists of a playing apparatus and a coil-holder separated therefrom and having two coils on whose cores the film is wound or has to be wound. Furthermore the invention relates to the coil-holder to be used in such a device.

Projectors comprising separated coil-holders are known which are constructed in such manner that the film can be played inside the coil holder. To this end the coil holder has, for example, two apertures one of which serves as a picture gate and the other giving access to the projection light originating from the source of light located outside the coil-holder. For the reproduction of sound a similar construction may be provided. Such coil-holders comprise a part of the driving members which are started up automatically by coupling with the playing apparatus upon introduction of the coil holder.

The use of these projectors having separate coil-holders as domestic cinemas or film gramophones has the advantage of a very simple control, the "threading" or installing of the film so difficult for laymen being completely superfluous. More particularly when making use of small films having a thickness of 80μ or less, for example a film entirely or partly made from regenerated cellulose, threading is a great inconvenience, since, apart from the risk of the film being put in incorrectly, damaging or fracture of the film may readily occur due to inexpert treatment. A further consequence of the said simple control is that the playing of a programme of several successive films can take place very smoothly, as the exchange of coil-holders can occur in a very short time.

The drawback of the aforesaid conventional construction is, however, that the coil-holders must be comparatively large, because they contain part of the playing members required for the reproduction. These comparatively fragile parts which require a high degree of precision, for example the pre- and after-winding reels and the guide path for the picture gate render such a coil-holder, of course, comparatively expensive, which is a great drawback more particularly for the purchase of several of such coil-holders for domestic cinemas or film gramophones by private persons. Furthermore there is a risk of the film contacting with lubricating means which are required in the coil-holder for the said parts of the driving mechanism.

The present invention has for its object to procure a device comprising a coil-holder, which has all of the said advantages, but not the disadvantages of the conventional constructions, the coil-holder thus comprising, except the two coil-cores on or from which the film is or has to be wound and, as the case may be, some few guide rollers, not a single part for playing the film. To such end the device according to the invention is constructed in such a manner that the playing apparatus comprises means to draw a loop of the film outside the coil-holder through an aperture designed for this purpose, which loop is subsequently coupled with the driving gear of the playing mechanism to enable the film to be played and after the playing of the film, is inserted again in the coil-holder. The coil-holder may have a very simple construction and need only have one aperture through which the said film loop can be drawn out. This aperture need only be available on introducing the coil-holder into the playing apparatus and may be formed automatically during the introduction.

Drawing the film-loop out of the coil-holder occurs after the introduction of the coil-holder and may take place automatically by this introduction. It is, however, also possible to effect this through a separate control member e. g. a push-button.

In addition the starting up of the driving motor of the playing apparatus may either occur automatically by the introduction of the coil-holder or through a push-button. In both cases it is possible to construct the playing apparatus in such a manner that the motor during reproduction of several succeeding films of a programme keeps running continuously.

In general the film-loop can be drawn out of the coil-holder by means of a suitable member e. g. a lever having a scanning member fastened to it which is automatically actuated upon introduction of the coil-holder. Consequently, the mechanism for moving the member preferably forms part of the mechanism of the playing apparatus.

After reproduction of the film the following manipulations may take place automatically: the loop is reinserted in the coil-holder; the aforesaid scanning member is put out of action, and may be drawn back from the coil-holder; the coupling between coil-holder and playing mechanism is thrown out, the coil-holder may be thrown out and the motor or the playing mechanism may be stopped.

To minimize the size of the coil-holder, the spindles of the coils on or from which the film is wound and unwound respectively during playing, may be spaced apart by a distance which is less than two times, but not less than once the radius of the completely wound film coil.

The separate coil-holder to be used in the devices as described is characterized by a recess and by members for guiding the film in this recess in such a manner that there is sufficient space between the film and the edge of the recess to accommodate the end of a loop-forming member as described above.

In order that the invention may be clearly understood and readily carried into effect, it will now be set out more fully with reference to the accompanying drawing, in which some few forms of construction are represented by way of example.

Figure 2A:
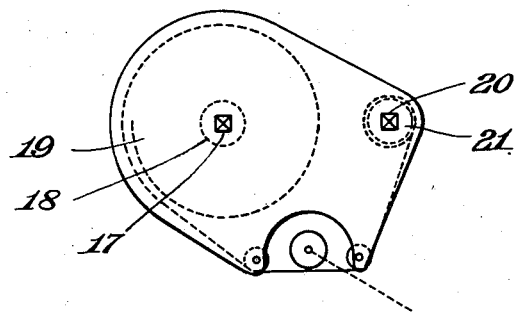

Fig. 1 represents diagrammatically part of a playing apparatus comprising a coil-holder according to the invention. Fig. 2a shows a simple form of construction of a coil-holder to be used in a device according to the invention and Fig. 2b shows the same coil-holder after playing but prior to rewinding.

In Fig. 1 the reference numeral 1 designates part of the playing apparatus which comprises a coil-holder 2 constructed as a separate unit. This coil-holder contains the cores 3 and 4 on which the film is wound. As the case may be, use may be made of coils having flanges between which the film is guided. In the form of construction shown by way of example, in which these flanges are omitted, the film is enclosed between the stationary side-walls of the coil-holder.

The cores 3 and 4 exhibit square apertures which enable a coupling with the square spindle ends 6 and 7 that are provided in the playing apparatus and coupled with a motor through friction couplings. The playing apparatus comprises a lever 8 with a roller 9 which engages the film 5 in a recess 10 of the coil-holder between the guide rollers 12 and 13 supported in the coil-holder and immediately upon introduction of the coil-holder moves out of the coil-holder to the outside about the centre of rotation 11 to the position 8a—9a, as a result thereof a loop 5a is formed which, between the rollers 14 and 15, over which it passes, is brought into contact with the continuously rotating driving spindle 16. Between the rollers 14 and 15 the film passes at the same time in front of the gates for the reproduction of pictures and sound (not shown for the sake of simplicity). After playing the lever 8 may automatically be caused to resume its initial position and the loop to enter the coil-holder again. This may, for example, take place by providing that the film, after being unwound from one coil, is kept taut and is then capable of moving back the lever 8.

Figure 2B:
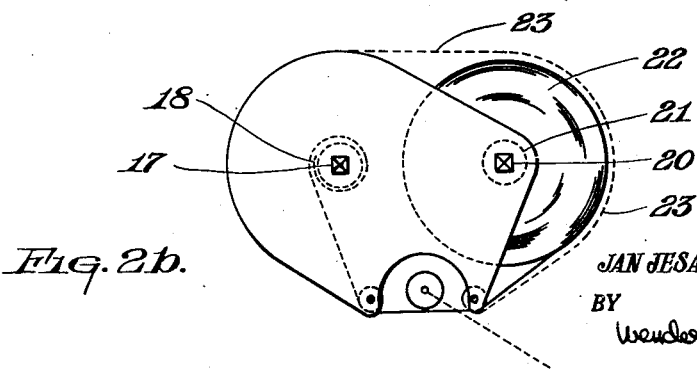

Figs. 2a and 2b show another form of construction of the coil-holder. The spindle end 17 (Fig. 2a) which drives the winding coil comprising the core 18 is located at a distance of less than twice the radius of the completely wound film coil 19 from the spindle end 20 on which is secured the unwinding coil comprising a core 21.

As appears from the figure this yields a smaller coil-holder than that shown in Fig. 1.

Fig. 2b shows the state after playing. The entirely unwound film roll 22 is located on the core 21. If it should be deemed objectionable that the coil 22 extends unprotected from the coil-holder it is advisable to wind the film automatically back after playing, so that when taking out the coil-holder it contains again the whole of the film. It is, however, also possible to complete the coil-holder according to the dotted line 23, with the result that the shape shown in Fig. 1 ensues again, but now it has a smaller size.

What I claim is:

1. Apparatus for transcribing intelligence recordable on a band-shaped recording medium, comprising a magazine and a transducer having means to receive said magazine, said magazine comprising a housing in which there is provided two reels upon which said recording medium is arranged, said magazine housing being provided with a recess between said reels to expose a portion of said recording medium, said transducer comprising means to drive said recording medium, means to engage said exposed portion of the recording medium within said recess, and means to move said engaging means to a position remote from said recess to displace said recording medium to an operating position remote from said magazine housing and into engagement with said driving means.

2. Apparatus for transcribing intelligence recordable on a band-shaped recording medium, comprising a magazine and a transducer having means to receive said magazine, said magazine comprising a housing and two spaced reels therein upon which said recording medium is arranged, said housing being provided with a recess between said reels to expose a portion of said recording medium, said transducer comprising means to drive said recording medium, means to engage said exposed portion of the recording medium within said recess, an arm member coupled to said engaging means, said arm member being movable to move said engaging means to a position remote from said recess to displace said recording medium to an operating position remote from said magazine housing and into engagement with said driving means.

3. Apparatus for transcribing intelligence recordable on a band-shaped recording medium, comprising a magazine and a transducer having means to receive said magazine, said magazine comprising a housing and two spaced reels and a plurality of guide members therein upon which said recording medium is arranged, said housing being provided with a recess between said reels to expose a portion of said recording medium, said transducer comprising means arranged at a position remote from said magazine to drive said recording medium, means to engage said exposed portion of the receiving medium within said recess portion, a pivoted arm member coupled to said engaging means, said arm member being movable about the pivot thereof to move said engaging means to a position remote from said recess to displace said recording medium to an operating position remote from said magazine housing and to couple said engaging means to said driving means.

4. Apparatus for transcribing intelligence recordable on a band-shaped recording medium, comprising a magazine and a transducer having means to receive said magazine, said magazine comprising a housing in which is arranged two reels upon which said recording medium is arranged, said magazine housing being provided with a recess between said reels to expose a portion of said recording medium, said transducer comprising means to drive said recording medium, means to engage said exposed portion of the recording medium within said recess, means to move said engaging means to a position remote from said recess to displace said recording medium to an operating position remote from said magazine housing and into engagement with said driving means, and means operatively associated with said reels for retracting said recording medium into said magazine housing and then keeping said recording medium taut in said recess when said engaging means is moved back into said recess.

5. Apparatus for transcribing intelligence recordable on a band-shaped recording medium, comprising a magazine and a transducer having means to receive said magazine, said magazine comprising a housing and two spaced reels and a plurality of guide members therein upon which said recording medium is arranged, said housing being provided with a recess between said reels to expose a portion of said recording medium, said transducer comprising means arranged at a position remote from said magazine housing to drive said recording medium, means to engage said exposed portion of the receiving medium within said recess portion, a pivoted arm member coupled to said engaging means, said arm member being movable about the pivot thereof to move said engaging means to a position remote from said recess to displace said recording medium to an operating position remote from said magazine housing and to couple said engaging means to said driving means, and means operatively associated with said reels for retracting said recording medium into said magazine housing and then keeping said recording medium taut in said recess when said engaging means is moved back into said recess.

JAN JESAYAS CHRISTIAAN HARDENBERG.

REFERENCES CITED

The following references are of record in the file of this patent:

UNITED STATES PATENTS

| Number | Name | Date |
| --- | --- | --- |
| 1,100,591 | Von Madaler | June 16, 1914 |
| 1,944,023 | Ford | Jan. 16, 1934 |
| 1,975,782 | Foster | Oct. 9, 1934 |
| 2,051,206 | Fairbanks | Aug. 18, 1936 |
| 2,175,538 | Morsbach et al. | Oct. 10, 1939 |
| 2,195,268 | Cazes | Mar. 26, 1940 |
| 2,227,259 | Hokanson | Dec. 31, 1940 |
| 2,238,719 | De Tartas | Apr. 15, 1941 |
| 2,384,637 | Owens | Sept. 11, 1945 |
| 2,501,573 | McLonth et al. | Mar. 21, 1950 |